United States Patent [19]

Buchs

[11] 4,273,818
[45] Jun. 16, 1981

[54] FORCE INFEED ELEMENT FOR LAMINAR PANEL ASSEMBLY

[75] Inventor: Wolfgang Buchs, Valley, Fed. Rep. of Germany

[73] Assignee: Messerschmitt-Bölkow-Blohm GmbH, Munich, Fed. Rep. of Germany

[21] Appl. No.: 75,993

[22] Filed: Sep. 17, 1979

[30] Foreign Application Priority Data

Sep. 20, 1978 [DE] Fed. Rep. of Germany ....... 2840807

[51] Int. Cl.³ .................................................. B32B 3/12
[52] U.S. Cl. ....................................... 428/116; 52/787; 136/292
[58] Field of Search ................. 428/116, 73, 117, 118, 428/119, 120; 52/787; 136/292

[56] References Cited

U.S. PATENT DOCUMENTS

| 2,952,579 | 9/1960 | Merriman | 428/131 X |
| 3,137,887 | 6/1964 | Mannino et al. | 428/116 X |
| 3,138,506 | 6/1964 | Ross | 428/116 X |
| 3,166,149 | 1/1965 | Hulse et al. | 428/255 X |
| 3,170,471 | 2/1965 | Schnitzer | 428/116 X |
| 3,256,649 | 6/1966 | Webb | 428/116 X |
| 3,282,533 | 11/1966 | Spain | 428/12 X |
| 3,341,050 | 9/1967 | Forman et al. | 428/116 X |
| 3,890,749 | 6/1975 | Gunther | 52/84 |
| 4,014,147 | 3/1977 | Wesch | 428/116 X |

FOREIGN PATENT DOCUMENTS

| 2336541 | 6/1975 | Fed. Rep. of Germany . | |
| 2032508 | 5/1980 | United Kingdom | 428/118 |

*Primary Examiner*—Henry F. Epstein
*Attorney, Agent, or Firm*—Toren, McGeady and Stanger

[57] ABSTRACT

A laminar panel assembly which is particularly useful in space vehicles for contact with solar cells includes a first and a second cover layer, a supporting core structure interposed between the cover layers and at least one force infeed element disposed within the core structure between the cover layers. The force infeed element includes at least one solid central piece for punctiform load infeed, and shear webs extending from the central piece radially outwardly in a branched formation such that the number of shear webs increases with increasing radial distance from the central piece.

15 Claims, 6 Drawing Figures

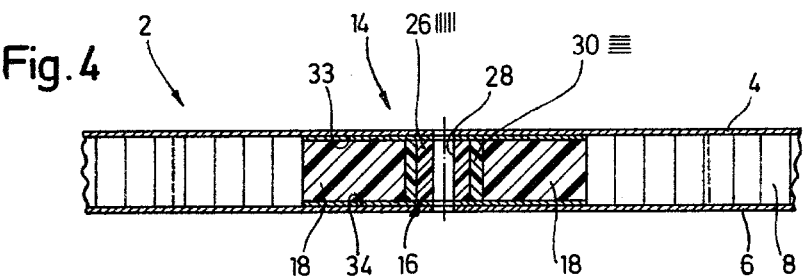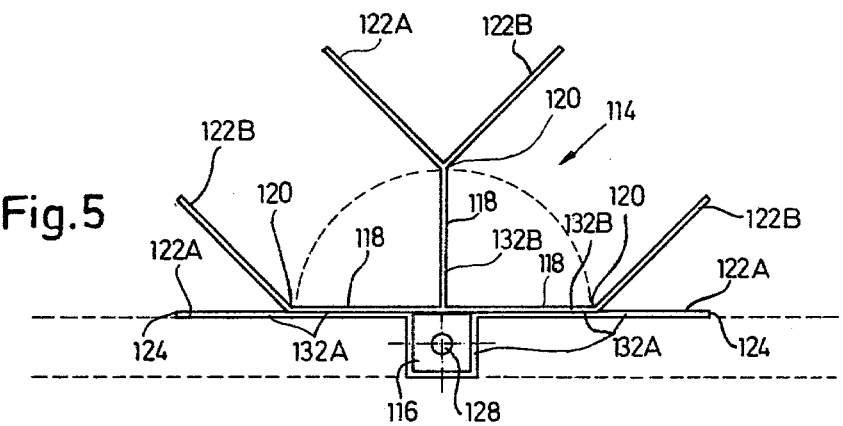

FORCE INFEED ELEMENT FOR LAMINAR PANEL ASSEMBLY

BACKGROUND OF THE INVENTION

The present invention relates generally to a laminar panel assembly consisting of an upper and a lower cover layer having a support core structure therebetween, particularly a panel assembly which may be utilized as a panel for a space satellite in contact with solar cells. The invention is particularly directed toward the structure of a force infeed element capable of providing for punctiform load infeed to the panel assembly.

Force infeed elements of the type to which the present invention relates, known for example from German DE-OS No. 23 36 541, are anchored in the interior of a laminar member in order to permit distribution of punctiformly introduced loads with as uniform a distribution as possible without causing enlargement or distortion of the smooth, flat outer contour of the laminar member. Such force infeed elements usually consist of strip shear webs which emanate outwardly from a force infeed point and which are inserted at the time of the manufacture of the laminar member prior to bonding of the cover layers. These elements are located in a recess of the support core and are usually of a light metallic honeycomb construction. The recess corresponds to the contour of the force infeed element and spaces between the webs of the assembly are normally filled with a filling material which may, for example, be hard foam. Additionally, in order to establish reinforcement of the assembly, reinforcement plates or doublers are disposed on the inner side of the cover layers in the region of the webs.

The installation of these known force infeed elements is, however, expensive when compared to the manufacture of the laminar members which tends to be relatively easy, and correct load distribution of the webs along the outer region of the force infeed elements may lead in the inner regions contiguous to the central piece of the element to an excessive web density and hence to accumulation of material and increase of the weight factor.

The present invention is directed toward the task of improving known force infeed elements of this type in such a way that local overdimensioning may be avoided in the structures of these devices and so that a uniform strain-free distribution of punctiformly impinging loads into the laminar structure may be insured while increasing the volumnmetric weight of the laminar member to as little a degree as possible.

SUMMARY OF THE INVENTION

Briefly, the present invention may be described as a laminar panel assembly including a first and a second cover layer, a support core structure interposed between said cover layers and at least one force infeed element disposed within the core structure between the cover layers for punctiform load infeed to the panel assembly. The force infeed element comprises at least one solid central piece extending between the cover layers for the punctiform load infeed, and shear resistant webs extending from the central piece and having a generally planar configuration positioned substantially perpendicularly to the cover layers. The shear webs are arranged to extend into partial areas of the support core structure surrounding the central piece and they are surface-bonded therewith. In accordance with the principles of the invention, the force infeed element is constructed with the shear webs extending radially outwardly from the central piece in a branched formation such that the number of shear webs increases with increasing radial distance from the central piece.

In the force infeed element in accordance with the invention, the shear resistant webs are not only imbedded between the cover layers but they are also imbedded directly in the support core structure extending as a single piece between the shear webs. The webs are surface-bonded with the support core structure thereby resulting in simplified production techniques since subsequent foaming or filling of cavities after insertion of the force infeed element into the support core may be eliminated. However, this technique offers the special advantage, in terms of strength, that the impinging shear and transverse forces will be introduced from the shear webs into the support structure in a direct path along the large bonding surfaces. Together with the special web pattern which is branched from the force infeed element, this insures a much better uniformity of load distribution on the cover layers over the entire surface area defined by the forced infeed element and above all on the support core structure without causing accumulation of web material which is not utilized in terms of the strength of the assembly in the region of the force infeed point due to excessively close web sequence. The force infeed element of the invention forms an integral part of the laminar panel structure, and the carrying capacity of the structure is maintained also between the shear webs and is fully utilized there due to the ramified web configuration and due to the resulting uniform force flow distribution for introduction of the punctiformly impinging loads. Because of the mode of construction involved, which is optimally selected as to load and material and which is at the same time extremely economical from a weight point of view, the force infeed element of the invention is especially suitable for use in connection with laminar structures of aircraft or spacecraft, and in particular in connection with solar generators of communication satellites where a minimum of surface area contacting with the solar cells must be lost due to installation of the force infeed element while at the same time insuring high load capacity and above all high transverse forces which must be introduced without substantially increasing the volumnmetric weight of the laminar structure.

In another advantageous embodiment of the invention, the central piece may also be expediently surfaced-bonded with contiguous wall sections of the support core in order to further improve the force transmission from the force infeed element to the laminar structure. With a view toward achieving still greater saving of material and especially of weight, the cross section of the shear-resistant webs decreases outwardly, preferably in accordance with the local reduction of force flow with a particularly preferred measure being that, at each branching point of the webs, the wall thickness of an unbranched web section is made equivalent to the sum of the wall thicknesses of the web sections originating therefrom. A geometrically favorable, uniform and weight-saving web distribution may be achieved by virtue of the fact that corresponding branching points or, respectively, outer ends of the individual shear webs lie on corner points of a preferably regular polygon which is symmetrical with the central piece.

For reasons of high load stability, and in order to avoid thermal stresses due to different coefficients of thermal expansion, the central piece and the shear webs secured thereto will be expediently made of the same high-strength material as the cover layers and, in order to enhance the advantages of the invention from the point of view of production and strength, the central piece and the shear webs are formed as a unitary part.

A particularly desirable material selection and advantageous design, from a material viewpoint, of the force infeed element may be achieved by making the shear webs of a fiber laminate with crossing fiber arrangements inclined at an angle of ±45° to the longitudinal direction of the web with each shear web comprising at least one fiber ply with crossing fiber arrangements extending continuously from the outer end of the web being bonded over a peripheral section of the central piece to the outer end of the adjacent shear web, this creating an advantage both in terms of production and strength.

In accordance with another especially favorable embodiment of the invention, a central piece is made of fiber laminate with an inner fiber layer which receives at least one load infeed bore or bushing whose fiber arrangement is unidirectional in the axial direction of the bore, with a second fiber layer surrounding the inner fiber layer and having a fiber arrangement which is also unidirectional but which extends in the circumferential direction of the bore substantially normal to the fibers of the inner layer. As a result, axial initial stress or vibration forces transmitted to the central piece by a load infeed bolt inserted in the bore or bushing of the central piece will be absorbed by the inner fiber layer while the second fiber layer, extending in the circumferential direction, will prevent bursting of the inner fiber layer and will absorb the radial compressive forces caused in forming the longitudinal bore, in pressing in of the bushing or bolt or by different thermal expansion coefficients of the fiber laminate, on the one hand, and the bushing or bolt, on the other hand. For reasons related to the assembly procedures, the load infeed bore will be arranged to extend normal to the surface extension of the cover layers and it is made only after the bonding of the laminar member including the central piece and the shear web, whereby tolerances related to the production procedures arising in the installation of the force infeed element will be compensated for in a simple manner.

In order to reduce locally higher longitudinal stresses in the cover layers, it is preferable to glue reinforcement plates, or so called doublers, between the inner faces of the cover layers and the central piece, with the doublers extending to between the cover layers and the shear webs and support core regions of the force infeed member. However, because of favorable force flow distribution created by the force infeed element in accordance with the invention, it will be found sufficient, in accordance with the preferred embodiment of the invention, if the reinforcement plates extend only over a circular or polygonal surface area limited by the radially innermost branching points of the shear webs, taken from the central piece, thereby affording a noticeable saving of weight as compared with the usual doublers which are utilized and which extend up to the outer shear ends. In this case, the shear webs and the support core are provided prior to bonding with an expedient step-type recess which corresponds in size and wall thickness to the reinforcement plates in order to make possible a recessed arrangement of the reinforcement plates and bonding of all separate elements in a single operation.

While the force infeed element of the invention, when disposed on the interior regions of the laminar assembly, will have a completely symmetrical spatial arrangement with regard to the central piece or pieces, for installation at the outer edge of the laminar member where the covers layers are generally reinforced on the inside by longitudinal ribs or straps, it is expedient to design the structure with a partial symmetry and to then cover a surface sector limited by the outer edges of the laminar member at the point of installation, the central piece being fastened without interposition of reinforcement plates directly between the edge-reinforced cover layers of the laminar member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the Drawings:

FIG. 4 is a cross-sectional view showing the parts of FIG. 3 after bonding and taken on a smaller scale;

FIG. 5 is a plan view of a force infeed element adapted for installation at the edge of a laminar panel assembly; and FIG. 6 is a plan view showing a further embodiment of a force infeed element of the invention having two juxtaposed central pieces and shown in a highly schematic representation.

DETAILED DESCRIPTION OF THE PREFERRED EMBODIMENTS

Figure 1:
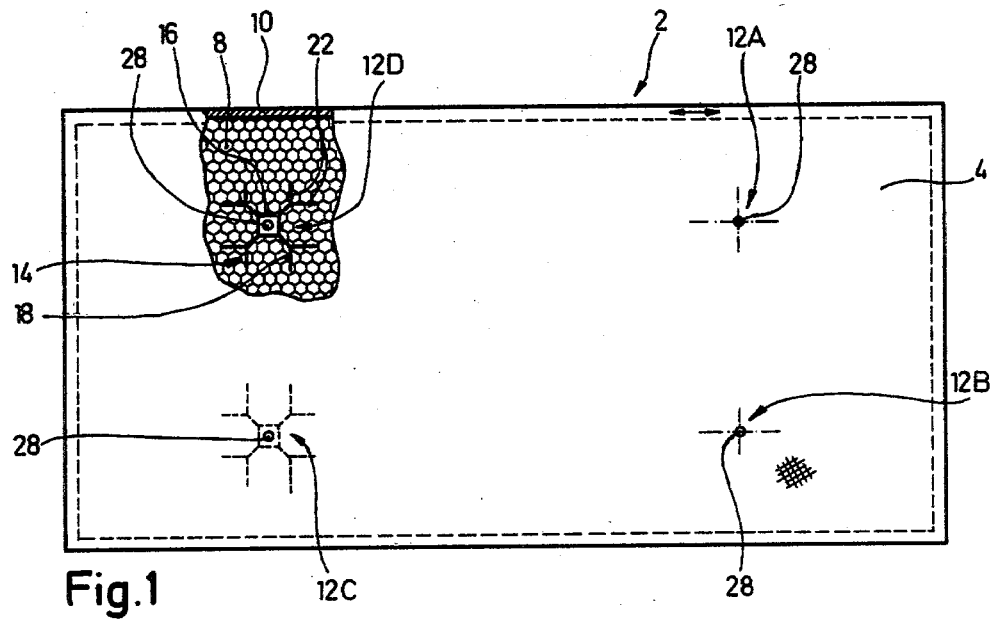
FIG. 1 is a plan view of a laminar panel assembly including four force infeed elements in accordance with the invention, with the upper cover layer of the assembly being broken away in the region of one of the force infeed elements with the associated reinforcement plate being removed for further clarity.

An overall laminar panel assembly 2 embodying the present invention is depicted in plan view in FIG. 1, the panel assembly consisting of upper and lower cover layers 4 and 6 and being especially suitable for use with a communications satellite and for contact with solar panels.

Figure 3:
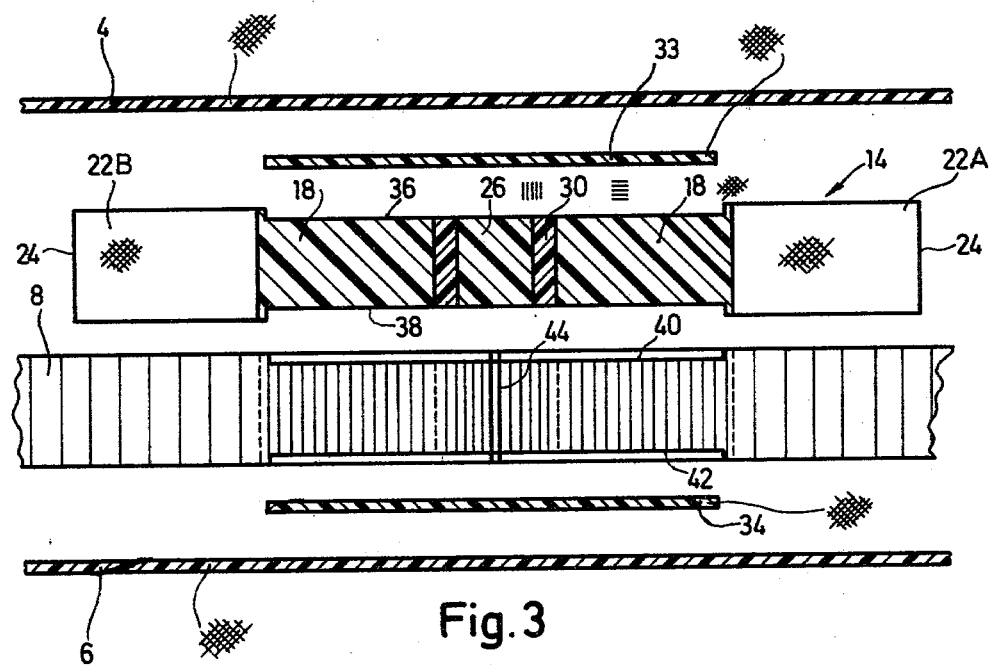
FIG. 3 is an exploded cross-sectional representation of the laminar panel assembly of the invention and of the force infeed element shown before assembly thereof and taken along the line 3—3 of FIG. 2.

The upper and lower cover layers 4, 6, probably best seen in FIG. 3, are made of carbon fiber synthetic material, having crossing fiber directions. The panel assembly also includes a support core structure 8 which is in the form of an aluminum honeycomb core of low volumnmetric weight, for example 16 kg/m$^3$, glued between cover layers 4, 6. At the outer edge of the panel 2, the cover layers 4, 6 are reinforced at the inner faces thereof which are turned inwardly toward each other by longitudinal straps having fiber direction orientation which is unidirectional in the longitudinal direction of the straps, as shown in FIG. 1 in broken line form. The straps are provided with an edging 10.

As will be noted in the drawings, fiber direction is indicated in the various figures thereof by corresponding hatching or by arrows.

The panel 2 includes four locations indicated at 12A, 12B, 12C and 12D spaced inwardly from the edges of the panel at which there are to be introduced into the panel 2 in a punctiform manner forces such as longitudinal forces, bending forces and particularly high transverse forces, which may be as high as 1700 N. These forces may be introduced with minimum losses during surface contact with solar cells.

Figure 2:
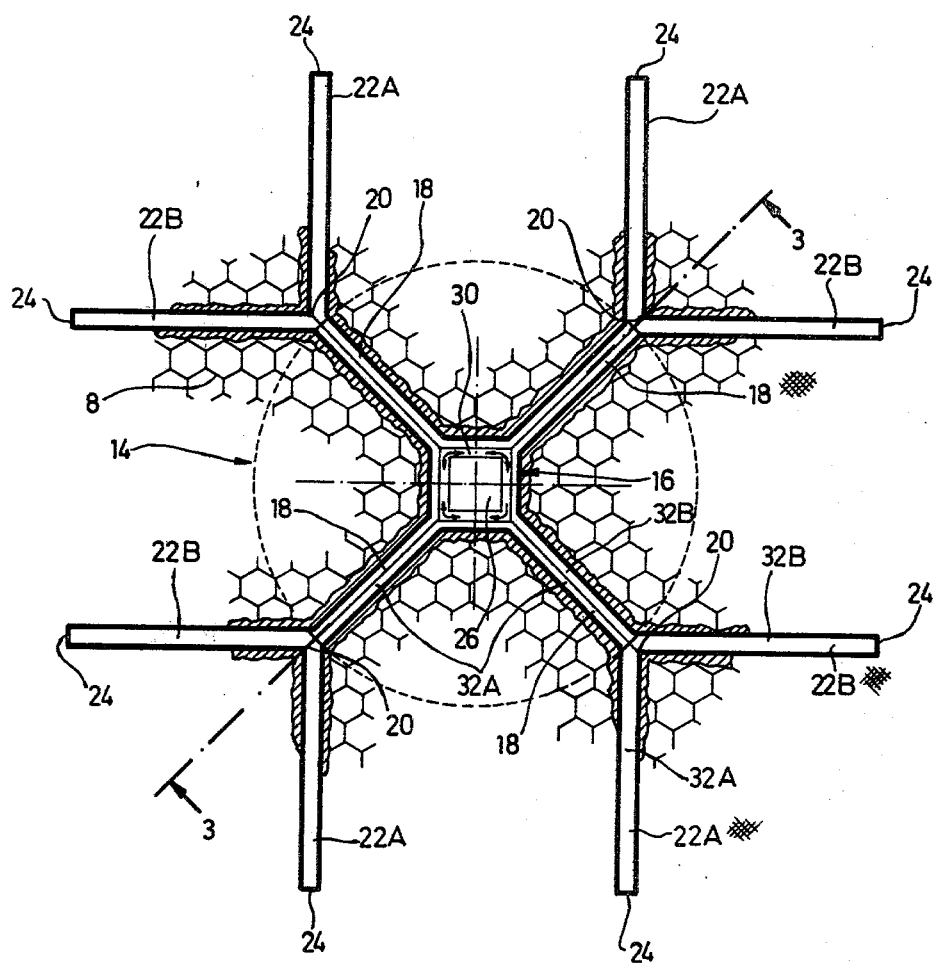
FIG. 2 is an enlarged plan view of the force infeed element shown in FIG. 1 depicted in the installed state.

For this purpose, the panel assembly 2 is provided with force infeed elements 14 shown in FIGS. 2–4 which are glued into the panel assemblies 2 between the cover layers 4 and 6 at each of the force infeed points 12.

As shown most clearly in FIG. 2, the force infeed element 14 consists of a central piece 16 of substantially square cross-sectional configuration, with each central piece 16 having four corner points from which a shear web 18 extends radially outwardly. The shear web 18 is bifurcated at branching points 20 into two web sections 22A and 22B which extend outwardly at an angle of about 45° relative to the longitudinal direction of the shear web 18. All shear webs 18 including their web sections 22A and 22B are of generally identical design and configuration so that the outer web ends 24 of each of the web sections will lie at corner points of a regular octagon having the central piece 16 as its center.

The force infeed element 14 is a unitary part which consists also of carbon fiber synthetic material but with a different arrangement in the various regions in accordance with localized loads. The central piece 16 comprises an inner fiber layer 26. After bonding of the force infeed element 14 within the panel assembly 2, a longitudinal bore 28, as seen in FIG. 4, is drilled through from the outside through the inner fiber layer 26 traversing also the cover layers 4 and 6 and extending perpendicularly to the surface extension thereof in order to receive in the bore 28 a force infeed bolt (not shown) or a titanium bushing pressed into the bore 28. The inner fiber layer 26 has a fiber arrangement which is unidirectional in the axial direction of the central piece 16 or, respectively, the longitudinal bore 28. It is surrounded by another fiber layer 30 in which the fibers extend in a circumferential direction of the central piece 16; that is, substantially in planes perpendicular to the fiber direction of the inner layer 26, as is indicated by the arrows in FIG. 2 and by the horizontal hatching shown in FIGS. 3 and 4. The shear webs 18, and 22A, 22B have a crossing fiber arrangement inclined at an angle of ±45° to the longitudinal direction of the web. The web sections 22A, 22B each consist of a fiber ply 32A, 32B, with each ply converging at the branching point 20 and forming together the associated shear web 18 in such a manner that the web 18 will have a double wall thickness twice that of the web sections 22A, 22B and will then divide again at the associated corner point of the central piece 16 and then extend continuously, being bonded over a peripheral section of the central piece 16, into the directly adjacent web 18 up to the outer end 24 of the web section 22A or, respectively, 22B starting therefrom, as is shown for the fiber ply 32A in the lower portion of FIG. 2.

In order to reduce local longitudinal stresses in the cover layers 4, 6, circular reinforcement plates or so called doublers 33, 34 are glued on to the top and bottom sides of the force infeed element 14. The doublers 33 and 34 extend up to the branching points 20 as shown in broken line in FIG. 2 and they are made from the same fiber composite material as the cover layers 4, 6 so that they will also comprise a crossing fiber arrangement. The reinforcement plates 33, 34 are inserted in corresponding recesses 36, 38 formed in the force infeed element 14.

Installation of the force infeed element 14 is effected in the manner explained in connection with FIG. 3 simultaneously with production of the laminar panel 2. First, the honeycomb core 8 is provided at the intended stage of installation of the element 14 with recesses 40, 42 corresponding in size to the wall thickness of the doublers 33, 34 and then the element 14 is placed on the honeycomb core 8 whereupon the core is slit at locations corresponding with the webs 18, 22A, 22B and corresponding with the central piece 16 to form a slit 44 in the honeycomb core 8. A portion of the core 8 corresponding to the central piece 16 is removed. Element 14 is then inserted in the core 8 and any cells of the honeycomb core 8 which may have been pushed aside will be pressed against the side faces of the shear webs 18, 22A, 22B and of the central body 16. The doublers 33, 34 are placed in the recesses 36 to 42 of the element 14 or of the core 8, respectively. After application of the cover layers 4, 6 the entire arrangement is bonded under the action of pressure and heat and a single operation to form an integral structure by providing the cover layers 4 and 6 as well as the doublers 33 and 34 at their inner faces toward the core 8 and element 14, respectively, with a foil adhesive and by coating the force infeed element 14 at the side faces of the central piece 16 and of the webs 18, 22A, 22B contiguous with the core 8 with a splicing adhesive which swells under the action of heat and firmly connects the contiguous cells of the honeycomb core 8 with the outer faces of element 14 as indicated in FIG. 2 by the obliquely hatched areas at the interfaces between the core 8 and the element 14. With the panel 2 thus formed, longitudinal bores 28 traversing the panel 2 in the region of the inner fiber layer 26 are drilled at the force infeed points 12A, 12B, 12C and 12D in the manner described above. The bores 28 are drilled substantially perpendicularly to the surface extension of the cover layers 4, 6 and load infeed bushings (not shown) which may for instance be made of titanium are pressed into the bores 28.

The force infeed element in accordance with FIG. 5 is essentially of the same fundamental construction as the embodiment depicted and described in FIGS. 1–4 and the corresponding parts in FIG. 5 are identified by similar reference numerals increased by a factor of 100. The element 114 shown in FIG. 5 is, however, installed at the outer edge of a laminar panel assembly for punctiform introduction of forces and accordingly it is designed in a partially symmetrical arrangement, the sheer webs 118, 122A, 122B extending over a planar sector defined by the outer edge of the laminar member. The central piece 116 is secured without interposition of a doubler directly between the reinforced longitudinal straps, shown in broken line form, of the upper and lower cover layers of the laminar panel while the upper and lower doublers also shown in broken lines, cover the inner web sections 118 outside of the central piece 116 up to the branching points 120. The webs 118 will again have double the wall thickness of the webs 122 with fiber plies extending also in this embodiment continuously over the associated web 118 and a circumferential region of the central piece 116 into the adjacent shear web 118. From the branching point 120 thereof they extend up to the outer web end 124 of the respective web sections 122A, 122B, as is shown for the fiber ply 132A embracing the central piece 116 on three sides thereof. The half-symmetrical web arrangement is achieved in that the web sections 122A starting from the webs 118 extending in a longitudinal direction of the straps at the branching points 120 continue in the longitudinal direction of the webs 118 and are not inclined at an angle of 45° to the longitudinal direction of the inner webs 118, as was the case in the embodiment previously described. When arranged at a corner of the laminar panel, the web pattern is further modified in such a way that the webs 118 and 122A, 122B will be distributed only over a 90° sector. With regard to other considerations, the force infeed element 114 is produced and installed into the laminar panel assembly in the same manner as is the force infeed element 14 described with reference to FIGS. 1-4.

A force infeed element is shown in FIG. 6 wherein the parts correspond to the parts described in connection with the first embodiment of FIGS. 1-4, similar parts being identified with similar reference numerals increased by a factor of 200. The force infeed element according to FIG. 6 is again installed between the laminar cover layers and the honeycomb core in the manner described with reference to FIG. 3 at a point away from the outer edge of the panel. This arrangement includes doublers shown in broken line but it comprises two central pieces 216A and 216B arranged juxtaposed each with a longitudinal bore 228A, 228B, respectively and connected together by a web 218 of double wall thickness. The web 218 again consists of two fiber plies each extending continuously over a portion of the outer circumference of the two central pieces 216A, 216B and the adjacent shear webs 222A, 222B. The web pattern according to FIG. 6 essentially comprises a doubling of the web arrangement shown in FIG. 5 with the exception that, as in the case of the embodiment first described with reference to FIGS. 1-4, the webs 218 extend from the corner points of the central pieces 216A, 216B which are held spaced by a connecting web 218. Otherwise, the construction and installation of the force infeed 214 is essentially the same as that related to the embodiment described in connection with FIGS. 1-4.

While specific embodiments of the invention have been shown and described in detail to illustrate the application of the inventive principles, it will be understood that the invention may be embodied otherwise without departing from such principles.

What is claimed is:

1. A laminar panel assembly particularly useful in space vehicles for contact with solar cells including a first and a second cover layer, a support core structure interposed between said first and second layers and at least one force infeed element disposed within said core structure between said first and second layer for punctiform load infeed to said panel assembly, said force infeed element comprising at least one solid central piece extending between said cover layers for punctiform load infeed, and shear resistant webs extending between said cover layers from said central piece disposed substantially perpendicularly to said cover layers, said shear resistant webs being arranged to connect said cover layers and to extend into partial areas of said support core structure surrounding said central piece and being surface-bonded therewith, said force infeed element being constructed with said shear resistant webs extending radially outwardly from said central piece in a branched formation such that the number of shear resistant webs increases with increasing radial distance from said central piece.

2. A panel assembly according to claim 1 wherein said central piece is also surface-bonded with contiguous wall sections of said support core structure.

3. A panel assembly according to claims 1 or 2 wherein said branched formation includes branching points at which a plurality of shear resistant webs extend from a single web with the wall thickness of said single web from which said plurality of webs are branched being equal to the sum of the wall thicknesses of said branched webs.

4. A panel assembly according to claim 1 wherein said branched formation of said shear resistant webs includes branching points at which a plurality of webs emanate from a single web and outer ends of the branched webs defining terminal points of said force infeed element, with a plurality of said branching points and with said outer ends of said branched webs being arranged to lie on corner points of a regular polygon symmetrical with said central piece.

5. A panel assembly according to claim 1 wherein said central piece, said shear resistant webs and said cover layers are made from the same material.

6. A panel assembly according to claim 1 wherein said central piece and said shear resistant webs are formed together as a unitary member.

7. A panel assembly according to claim 1 wherein said shear resistant webs are made of fiber composite material having a crossing fiber arrangement inclined at an angle of ±45° taken relative to the longitudinal direction of said webs.

8. A panel assembly according to claim 7 wherein each of said shear resistant webs comprises at least one fiber ply having a crossing fiber arrangement extending continuously from the outer end of said web and being bonded over a peripheral section of said central piece to the outer end of an adjacent shear resistant web.

9. A panel assembly according to claim 1 wherein said central piece consists of a fiber laminate having an inner fiber layer having formed therethrough at least one load infeed bore defined by a part of said fiber layer whose fiber arrangement is unidirectional in the axial direction of said bore, said central piece also consisting of a second fiber layer surrounding said inner fiber layer and having a fiber arrangement which is also unidirectional but which extends in the circumferential direction of said bore substantially normal to the fibers of said inner fiber layer.

10. A panel assembly according to claim 9 wherein said load infeed bore extends normal to the surface extension of said cover layers.

11. A panel assembly according to claims 9 or 10 wherein said load infeed bore is formed in said panel assembly after said central piece and said shear resistant webs have been bonded in said panel assembly.

12. A panel assembly according to claim 1 further including reinforcement plates bonded between an inner face of said cover layers and said central piece, said reinforcement plates extending across said force infeed element to said shear resistant webs and to areas of said support core bonded thereto.

13. A panel assembly according to claim 12 wherein said reinforcement plates are formed to extend over a generally symmetrical area emanating from said central piece and limited by branching points of said branched formation of said shear resistant webs.

14. A panel assembly according to claims 12 or 13 wherein said shear resistant webs and said support core structure are provided with a stepped recess corresponding in size and wall thickness to said reinforcement plates with said reinforcement plates being located within said recess before said panel assembly is bonded together.

15. A panel assembly according to claim 1 wherein said force infeed element is arranged with a sector-type configuration for punctiform load infeed and is located at an edge of said laminar panel assembly, said central piece thereof being secured in a vertex region of a planar sector directly between edge-reinforced cover layers of said laminar planar assembly.

* * * * *